Feb. 3, 1942. J. PAULY 2,272,130
TRACK FORMING SHOVEL
Filed May 1, 1941
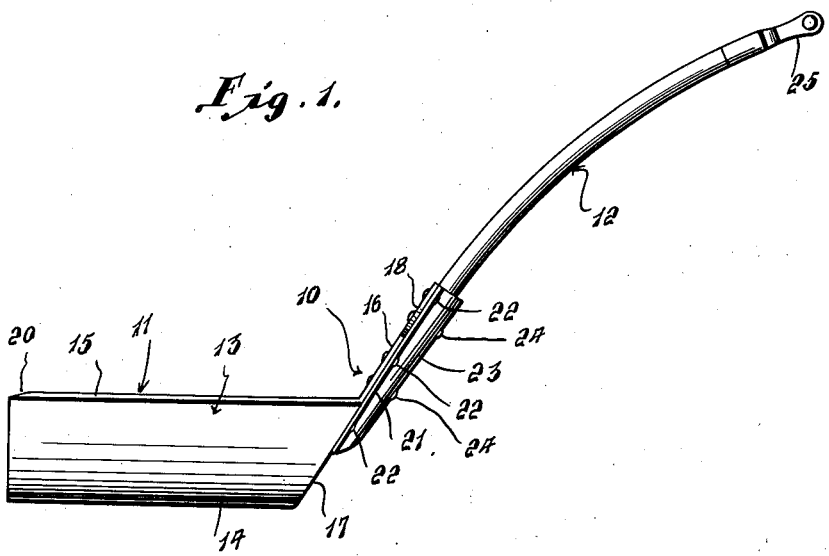
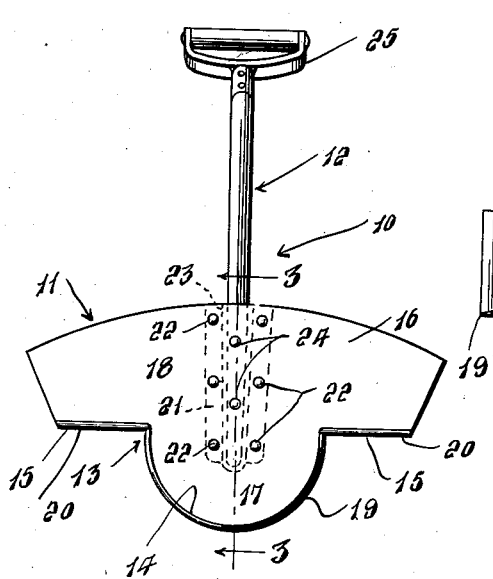
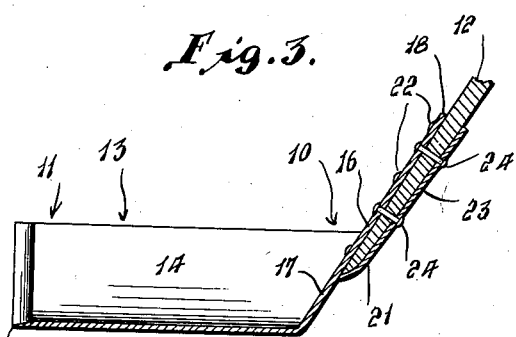
Inventor
John Pauly
By L. F. Randolph
Attorney Patented Feb. 3, 1942

2,272,130

UNITED STATES PATENT OFFICE 2,272,130

TRACK FORMING SHOVEL

John Pauly, Springfield, Mass.

Application May 1, 1941, Serial No. 391,403

6 Claims. (Cl. 294—54)

This invention relates to a novel construction of shovel particularly constructed and arranged for forming a track in snow for a pneumatic vehicle tire.

More particularly, it is an aim of the invention to provide a shovel for forming a guide track which will readily be followed by pneumatic tires to cause a vehicle to follow a predetermined course and to prevent side skidding.

Still another aim of the invention is to provide a track forming shovel by means of which a single track can be quickly and easily formed which will be followed by the pneumatic tires of one side of a vehicle so that the tires on the other side of the vehicle will cut a corresponding track, parallel to the track formed by the shovel to thus provide an implement by means of which otherwise inaccessible driveways or roadways can be rendered accessible quickly and easily and without removing the snow therefrom.

Still another aim of the invention is to provide a track forming shovel which may be used for forming a track in sand or mud for more readily extricating a mired vehicle.

Among the advantages of the implement are to provide a track forming shovel for forming a track in snow to provide a guide track from a garage to the nearest cleared highway which can be curved to correspond to the route to be followed by the vehicle; to provide an implement which can also be used to tamp and mold the track, particularly in early season soft snows; to provide an implement by means of which a single track can be readily formed in hard snow with less effort than would be required in using an ordinary shovel; to provide an implement to form a track for readily guiding a vehicle around obstructions or into a garage to avoid the danger of side skidding and damage to the vehicle, garage or other obstructions; and to provide an implement by means of which a single track can be readily formed for guiding a car away from a curb after snow has been thrown toward the car by a street cleaner or for guiding a car safely out of a parking area containing many vehicles.

Other objects and advantages of the invention will hereinafter become more fully apparent from the following description of the drawing, which illustrates a preferred embodiment thereof, and wherein:

Figure 1 is a side elevational view of the track forming shovel,

Figure 2 is a front elevational view of the same, and

Figure 3 is a longitudinal vertical sectional view taken substantially along the plane of the line 3—3 of Figure 2.

Referring more particularly to the drawing, wherein like reference characters designate like or corresponding parts throughout the different views, 10 designates generally the improved shovel in its entirety and which comprises a blade, designated generally 11 and a handle, designated generally 12.

The blade 11, which may be formed of any suitable material, includes an elongated horizontal portion, designated generally 13, which is provided with a central portion 14 which extends from end to end thereof and which is bowed downwardly to form a scoop which is arcuately shaped and substantially semi-circular in cross section or end elevation, as best illustrated in Figure 2, and which is sized to correspond to the cross sectional size of an ordinary balloon type pneumatic tire for an automobile. The side edge portions of the blade portion 13 project laterally from the side edges of the scoop 14 to form substantially flat wing portions 15 which are disposed in substantially the same horizontal plane as the upper part of the scoop 14.

The blade 11 also includes a rear wall 16 which is preferably formed integral with the horizontal portion 13 and which extends upwardly and rearwardly from the rear end thereof. The rear wall 16 includes a depending, substantially semi-circular intermediate portion 17 which closes the upwardly and rearwardly inclined rear end of the scoop 14, and an upper portion 18 which rises from the rear end of the horizontal portion 13 to a level substantially above the level of the wing portions 15 and which extends from beyond one longitudinal side edge of the portion 13 to beyond the other longitudinal side edge. The scoop 14 is open at its opposite, forward end and its forward edge 19 and the forward edges of the wing portions 15, designated 20, are sharpened to form the leading edge of the blade 11.

The shank end of the handle 12 is adapted to be secured to the back side of the wall 16 in any suitable manner, as by means of a plate 21 which is attached along its longitudinal edges by fastenings 22 to the back side of the wall 16 and which is provided with a longitudinally extending outwardly bowed intermediate portion forming an upwardly opening socket 23 for receiving the shank end of the handle 12 which is adapted to be secured therein by means of fastenings 24. As best seen in Figure 1, the handle 12 extends upwardly and rearwardly from the wall 16 and is moved longitudinally in an upward direction and is provided with a conventional handhold 25 at its upper, free end.

From the foregoing it will be obvious that the shovel 10 can be used in snow for forming a track in the snow by the snow scooped up by the scoop portion 14. The wing portions 15 will flatten the snow on either side of the track, not shown, formed by the scoop 14. The shovel 10 can be pushed through the snow and the wall 16 will form an abutment for holding the snow which is scooped up and which can be periodically shoveled out of the way of the track being formed. It will be obvious that the shovel 10 will offer less resistance to the snow and will require less effort to operate, as only a portion of the shovel extends into the snow to its entire depth. The horizontal portion 13 can also be used, as for example, in soft snow, for tamping and packing a track, corresponding to the shape of the scoop portion 14 and which will be flattened and packed tight on each side of the track thus formed by the wing portions 15.

As balloon type motor vehicle tires very readily follow any ridge or groove in a surface over which the tire is traveling and as it is very difficult to guide a tire out of a groove, it will be readily apparent that the pneumatic tires on one side of a motor vehicle will readily follow a track formed by the shovel 10 to thereby cause the tires on the other side of the vehicle to form a parallel track and when a vehicle is thus guided by a track formed by the shovel 10 there will be no danger of it leaving its predetermined course.

Obviously, the size of the scoop portion 14 can be varied to correspond to the width of different sized pneumatic tires so that shovels 10 may be built for use by large and small passenger automobiles as well as for buses, trucks and the like or any other vehicle equipped with pneumatic tires.

Various modifications and changes are contemplated and may obviously be resorted to as only a preferred embodiment of the invention has been disclosed.

I claim as my invention:

1. A tire track forming implement comprising a shovel blade having an intermediate depressed portion which extends from the front end to the rear end of the blade, flanges projecting outwardly from the side edges of said depressed portion, and said blade also including an upwardly projecting rear wall, said rear wall including portions projecting upwardly from the rear ends of said flanges, and a portion for closing the rear end of said depressed portion.

2. A vehicle tire track forming snow shovel comprising a blade including a substantially horizontal portion and an upwardly inclined rear wall portion, said rear wall portion projecting from one end of said horizontal portion and being adapted to be connected to a shovel handle, said horizontal portion including a longitudinally bowed central portion, said central portion being downwardly bowed and being arcuately shaped in cross section, and the longitudinal edge portions of said horizontal portion forming substantially flat wing portions which project laterally from the longitudinal edges of said central portion.

3. A track forming snow shovel comprising a shovel blade having a depressed portion which extends from the forward end to the rear end of the blade and which is spaced from its side edges, and a rear wall for closing the rear end of said depressed portion, said depressed portion being open at the forward edge of the blade, and said rear wall extending substantially above the level of the upper part of said depressed portion.

4. A tire track forming snow shovel comprising a shovel blade having an elongated horizontally disposed portion provided with a longitudinally disposed downwardly bowed intermediate portion forming a scoop, said intermediate portion being substantially semi-circular in cross section and being open at its forward end for cutting a track to receive a vehicle tire, said horizontal portion also including laterally projecting wings extending from the longitudinal edges of said semi-circular portion for flattening the snow on either side of the track, and a rear wall projecting upwardly and rearwardly from the semi-circular portion and wing portions, at their rear ends and forming an abutment.

5. A shovel having a blade provided with a depression, said depression extending from the forward to the rear end of the blade and being disposed intermediate of its side edges, the side edge portions of the blade forming laterally projecting wings which extend from the side edges of the depression, and a rear wall for closing the rear end of the depression.

6. A shovel as in claim 5, said rear wall extending above the plane of the blade and including laterally projecting flanges forming abutments for the rear ends of said wings.

JOHN PAULY.